United States Patent
Binder et al.

(10) Patent No.: US 10,389,074 B2
(45) Date of Patent: Aug. 20, 2019

(54) SLIP RING UNIT FOR A ROTOR OF AN ELECTRICALLY EXCITED ROTARY DYNAMO-ELECTRIC MACHINE

(71) Applicant: Siemens Aktiengesellschaft, München (DE)

(72) Inventors: Herbert Binder, Neuburg (DE); Oliver Memminger, Neuburg a. Inn (DE)

(73) Assignee: Siemens Aktiengesellschaft, München (DE)

( * ) Notice: Subject to any disclaimer, the term of this patent is extended or adjusted under 35 U.S.C. 154(b) by 109 days.

(21) Appl. No.: 15/566,973

(22) PCT Filed: Mar. 30, 2016

(86) PCT No.: PCT/EP2016/056905
§ 371 (c)(1),
(2) Date: Oct. 16, 2017

(87) PCT Pub. No.: WO2016/165939
PCT Pub. Date: Oct. 20, 2016

(65) Prior Publication Data
US 2018/0131149 A1    May 10, 2018

(30) Foreign Application Priority Data
Apr. 17, 2015  (EP) .................................... 15164054

(51) Int. Cl.
*H01R 39/08* (2006.01)
*H01R 39/34* (2006.01)
(Continued)

(52) U.S. Cl.
CPC ............. *H01R 39/08* (2013.01); *H01R 39/34* (2013.01); *H02H 3/165* (2013.01);
(Continued)

(58) Field of Classification Search
CPC ........ H01R 39/08; H01R 39/34; H02H 3/165; H02K 13/003; H02K 13/02; Y02E 10/725
(Continued)

(56) References Cited

U.S. PATENT DOCUMENTS

| 2,322,011 A   | 6/1943 | French |
| 2,551,030 A * | 5/1951 | Madden ................. H01R 39/08 29/597 |

(Continued)

FOREIGN PATENT DOCUMENTS

| CN | 202798359 U | 3/2013 |
| CN | 204216747 U | 3/2015 |
| GB | 1 266 620 A | 3/1972 |

OTHER PUBLICATIONS

PCT International Search Report and Written Opinion of International Searching Authority dated Jun. 7, 2017 corresponding to PCT International Application No. PCT/EP2016/056905 filed Mar. 30, 2016.

*Primary Examiner* — Thanh Lam
(74) *Attorney, Agent, or Firm* — Henry M. Feiereisen LLC

(57) ABSTRACT

A slip ring unit for an electrically excited rotor of a rotary dynamo-electric machine includes an electrical terminal which protrudes axially from an end face of the slip ring unit and having a contact point and a circumferential slip contact surface electrically connected to the electrical terminal. Disposed adjacent to the slip contact surface is an insulation element, with end plates axially retaining the circumferential slip contact surface and the insulation element. An electrically insulated support element is arranged on an end face of the slip ring unit and has a cross section which substantially matches a cross section of the slip ring unit. The support (Continued)

element axially surrounds the electrical terminal and radially supports the electrical terminal.

18 Claims, 4 Drawing Sheets

(51) Int. Cl.
  *H02H 3/16* (2006.01)
  *H02K 13/00* (2006.01)
  *H02K 13/02* (2006.01)

(52) U.S. Cl.
  CPC ........... *H02K 13/003* (2013.01); *H02K 13/02* (2013.01); *Y02E 10/725* (2013.01)

(58) Field of Classification Search
  USPC .......................................................... 310/233
  See application file for complete search history.

(56) References Cited

U.S. PATENT DOCUMENTS

| | | | | |
|---|---|---|---|---|
| 3,636,394 | A | * | 1/1972 | Forste ................. H01R 39/085 310/232 |
| 4,645,962 | A | * | 2/1987 | Freeman ................ H01R 39/08 310/232 |
| 7,019,431 | B1 | * | 3/2006 | Kerlin .................... H01R 39/30 310/232 |
| 7,307,367 | B2 | * | 12/2007 | Angerpointner ....... H01R 43/10 310/232 |
| 8,648,505 | B2 | | 2/2014 | Memminger et al. |
| 8,674,581 | B2 | * | 3/2014 | Toledo .................. H01R 39/34 310/232 |
| 8,686,607 | B2 | | 4/2014 | Elender et al. |
| 9,225,224 | B2 | | 12/2015 | Memminger et al. |
| 2011/0254391 | A1 | | 10/2011 | Elender et al. |
| 2011/0254395 | A1 | | 10/2011 | Friedl et al. |
| 2011/0278969 | A1 | | 11/2011 | Memminger et al. |
| 2012/0187793 | A1 | | 7/2012 | Hartmann et al. |
| 2013/0076168 | A1 | | 3/2013 | Memminger et al. |

\* cited by examiner

SLIP RING UNIT FOR A ROTOR OF AN ELECTRICALLY EXCITED ROTARY DYNAMO-ELECTRIC MACHINE

CROSS-REFERENCES TO RELATED APPLICATIONS

This application is the U.S. National Stage of International Application No. PCT/EP2016/056905, filed Mar. 30, 2016, which designated the United States and has been published as International Publication No. WO 2016/165939 A1 and which claims the priority of European Patent Application, Serial No. 15164054.7, filed Apr. 17, 2015 pursuant to 35 U.S.C. 119(a)-(d).

BACKGROUND OF THE INVENTION

The invention relates to a slip ring unit of a rotor of an electrically excited rotary dynamo-electric machine, the rotary dynamo-electric machine, and its application in generators of wind power installations.

Various designs of rotary dynamo-electric machines are known, in particular for use as wind power generators. These include a design in which a winding of the rotor is electrically supplied via slip rings. The currents of the rotors of these wind power generators must be led away from the winding of the rotor and linked to the slip ring unit. Litz wires with comparatively large cross sections greater than 90 mm$^2$ are used for this purpose.

Owing to the increasing runaway speeds of the rotors, the danger now exists that the terminal bolts of the slip ring unit may be damaged or work loose in their seating due to the centrifugal stress caused by the free mass of these litz wires. The consequence would be significant damage and/or failure of the generator and comparatively high repair costs.

Owing to the high current strengths, such cross sections of litz wires are now required in order to provide the electrical current carrying capacity. Therefore the now freely rotating masses are comparatively high and can no longer be ignored. In this case, use is customarily made of an end-lead bushing which has three copper profiles and provides a rigid down conductor in the interior of the shaft, connecting the winding of the rotor to the respective slip ring via stud bolts and flexible copper laminated strips. This has disadvantages with regard to the expense of high-current bushing and the significant cost of maintenance in the event of failure.

SUMMARY OF THE INVENTION

Taking this as its starting point, the object of the invention is to create a slip ring unit which is able to withstand the centrifugal stresses associated with even high-current rotor windings.

The stated object is achieved by a slip ring unit for an electrically excited rotor of a rotary dynamo-electric machine, with the rotor being rotatable about an axis, with the slip ring unit including at least one circumferential slip contact surface which is electrically connected to at least one electrical terminal protruding axially from an end face of the slip ring unit, wherein an end face of the slip ring unit is provided with an electrically insulated support element that substantially matches the cross section of the slip ring unit while axially surrounding and radially supporting the terminal.

According to the invention, the centrifugal bracing of the support element at the end face of the slip ring unit supports the terminal, in particular the terminal bolt, against the centrifugal stresses of a litz wire fastened thereto and its own centrifugal stress. The support element therefore achieves two objects, namely withstanding the centrifugal stresses and bracing litz wires and terminal bolts on one hand, while providing an electrical insulation in relation to the slip ring unit.

The support element is embodied as a support ring and advantageously surrounds all terminals and terminal bolts with an exact fit, and braces the terminal bolts in a radial direction by means of close-tolerance sizes. This means that the support element now absorbs the centrifugal force acting on the terminal bolts and therefore reduces the load on the terminals of the slip ring. The terminal bolts on the slip ring unit are thereby inventively prevented from being damaged or becoming detached from their respective locations. it is also advantageous that an expensive solution of a high-current bushing at the terminal can now be replaced by a comparatively cheaper solution featuring litz wire conductors, since the centrifugal stress is inventively absorbed by the support element.

Inventive use of the slip ring in dynamo-electric rotary machines makes it possible to realize high currents at the same time as high machine speeds, both in industry and in the field of wind power generators.

BRIEF DESCRIPTION OF THE DRAWING

The invention and further advantageous embodiments of the invention are explained in greater detail below with reference to Schematically illustrated exemplary embodiments, wherein.

DETAILED DESCRIPTION OF PREFERRED EMBODIMENTS

Figure 1:
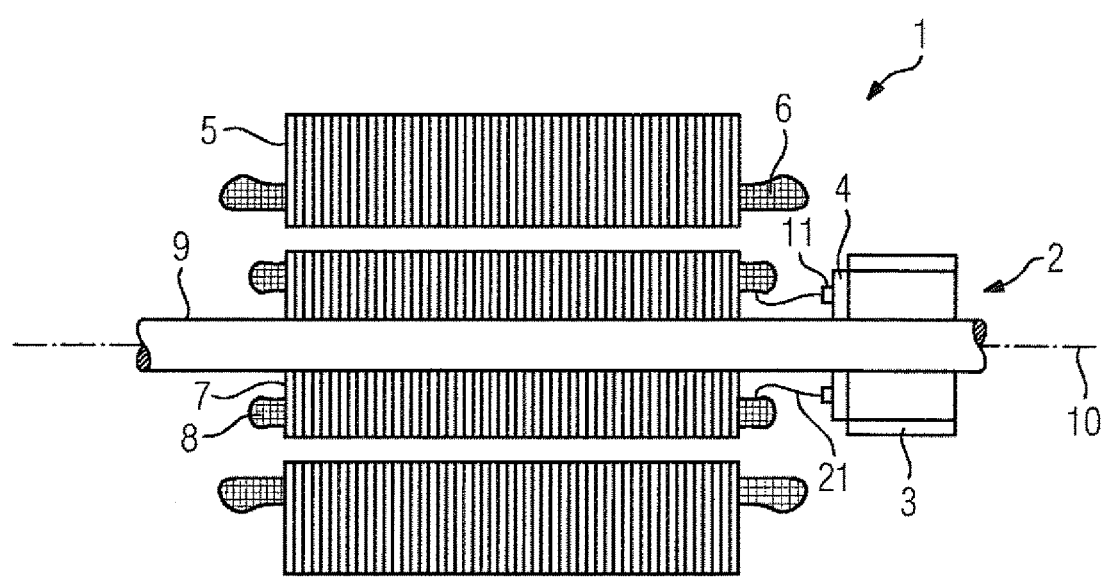
FIG. 1 shows a basic longitudinal section of a dynamo-electric machine.

FIG. 1 shows a basic illustration of a longitudinal section of a dynamo-electric machine 1 with a slip ring unit 2. The slip ring unit 2 and a rotor 7 are therefore fastened in a non-rotatable manner to a shaft 9, being coaxially aligned and rotating about an axis 10 at identical speeds.

By means of the slip ring unit 2, a winding system 8 of the rotor 7 is supplied with current via a brush device 3 which is not illustrated in detail. Furthermore, a stator 5 also has a winding system 6. The winding systems 6 and 8 each form end windings at the end faces of stator 5 and rotor 7. The winding systems 6, 8 are disposed in grooves (not shown in detail) in the stator 5 and rotor 7. An electrical connection between the winding system 8 of the rotor 7 and the slip ring unit 2 is effected via litz wire conductors 21 which are electrically connected to the terminal, in particular to a terminal bolt 11. In this case, a terminal has respectively one or more terminal bolts 11, which contact an electrical phase of the slip ring unit 2 in each case.

Figure 2:
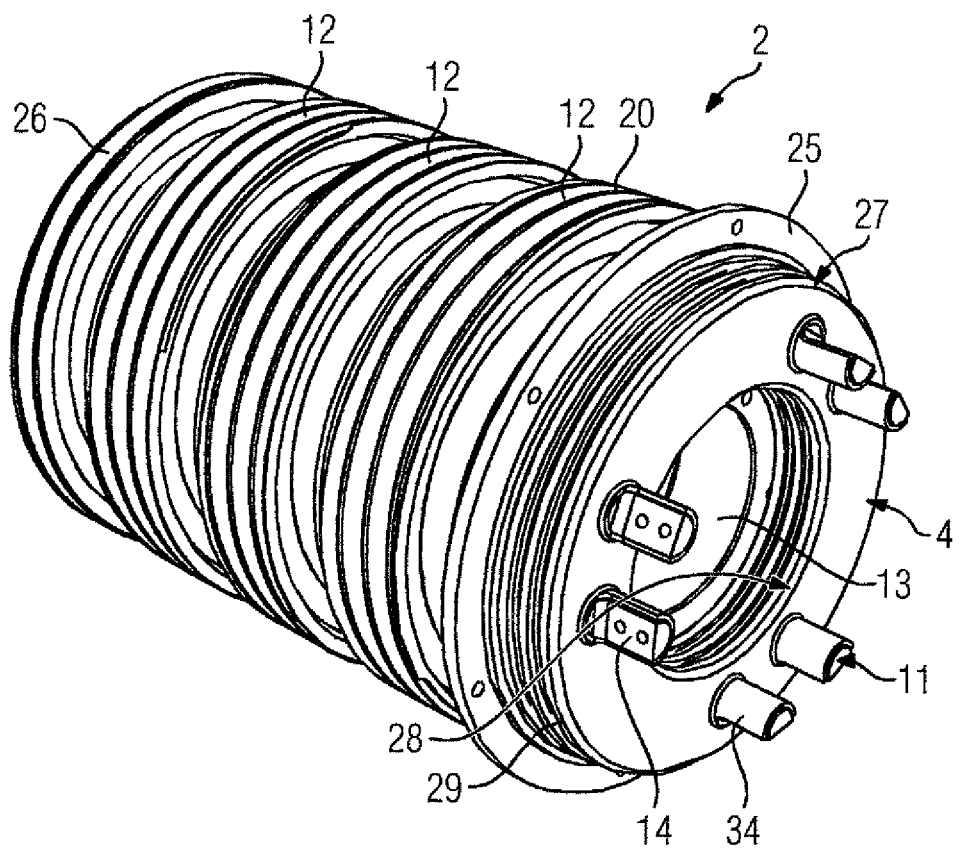
FIG. 2 shows a perspective illustration of a slip ring unit.

FIG. 2 shows a perspective illustration of the slip ring unit 2 with a shaft bore hole 13 and a support element 4 on the side facing the observer, six terminal bolts 11 protruding therefrom. Over their axial length protruding from the end face of the slip ring unit 2, the terminal bolts 11 are surrounded by the support element 4, which is embodied as a support ring. With the exception of their contact points 14, the terminal bolts 11 are surrounded by an insulation 34. In this case, a respective contact surface 14 is left free at the axial ends of the terminal bolts 11 in the region of the support element 4 in order to allow the litz wire conductors 21 to be electrically contacted to the terminal bolts 11.

Axially adjoining the support element 4 is the slip ring unit 2, this comprising an axial series of insulation elements and slip contact surfaces 12 which are axially retained by end plates 25, 26. In this case, a slip contact surface 12 is provided for each electrical phase L1, L2, L3, corresponding to the reference signs 15, 16, 17. Two terminal bolts 11 per phase 15, 16, 17 are provided in this embodiment. The slip contact surfaces 12 have furrows 20 which are preferably wavy in a circumferential direction in order to ensure an even wear of the carbon brushes.

The support element 4, which is embodied as an integral support ring, advantageously surrounds all terminals 11 and terminal bolts with an exact fit, and supports the terminal bolts in a radial direction by means of close-tolerance sizes. This means that the support element now absorbs the centrifugal force acting on the terminal bolts during operation of the electrical machine and therefore reduces the load on the terminals of the slip ring unit 2. The terminal bolts on the slip ring unit 2 are thereby now prevented from being damaged or becoming detached from their respective locations.

It is also advantageous that an expensive solution of a high-current bushing at the terminal 11 can now be replaced by a comparatively cheaper solution featuring litz wire conductors 21, since the centrifugal stress of the terminals 11, in particular of the terminal bolts, is inventively absorbed by the support element 4.

In this case, the expensive high-current bushing which is to be replaced refers in particular to a rigid down conductor consisting of copper profiles in the interior of the shaft and connecting rotor winding and slip ring together electrically via a plurality of stud bolts and flexible copper laminated strips.

Figure 3:
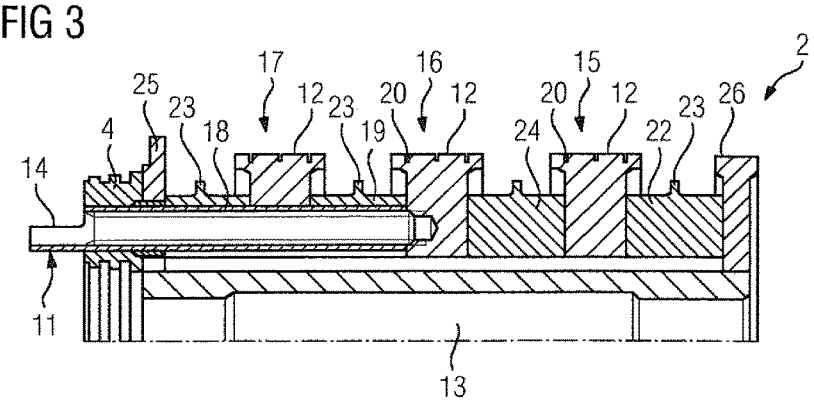
FIGS. 3 to 5 show partial longitudinal sections of the slip ring unit for different phases.
Figure 4:
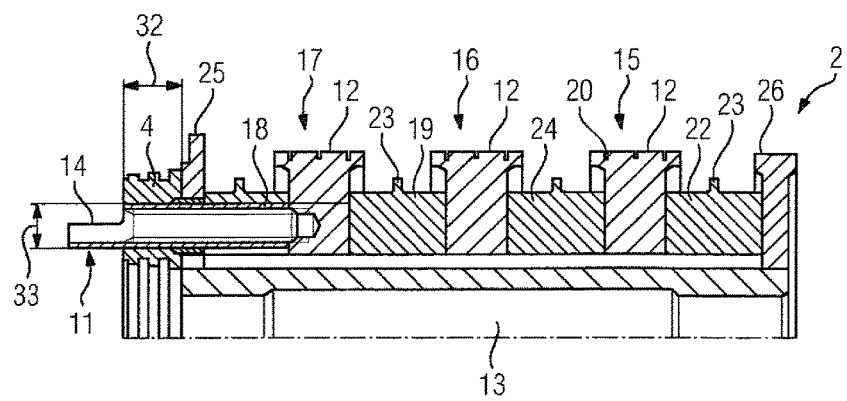
Figure 5:
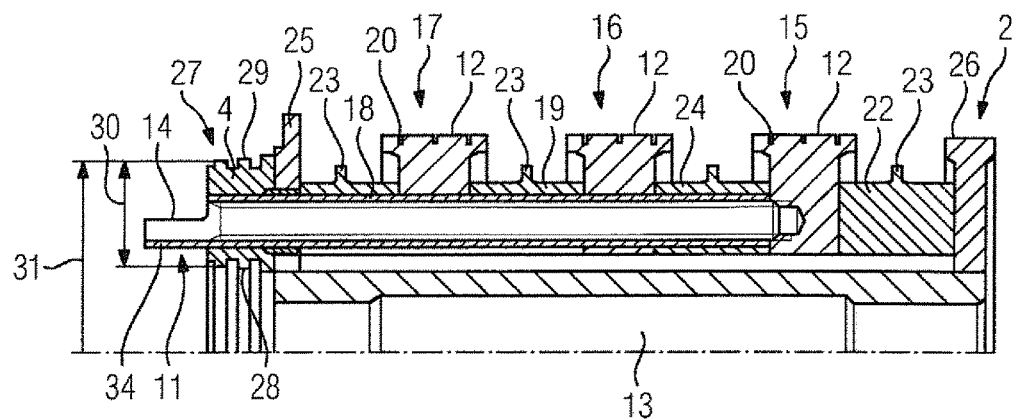

FIGS. 3 to 5 illustrate almost identical embodiments of a partial longitudinal section of a slip ring unit 2, wherein FIG. 3, FIG. 4 and FIG. 5 differ only in respect of the contacting between the respective terminal bolt 11 and its respective slip contact surface 12. The terminal bolts 11, in particular that of phase L1 denoted by reference sign 15, pass through the other contact surfaces of the other phases to the end face of the slip ring unit 2 in an insulated manner. This is particularly clear in the comparison of FIG. 3 to FIG. 5.

Insulation elements 19 and 24 designed to prevent electrical arcing between the phases are situated between the individual slip contact surfaces 12 of the respective phases L1, L2, L3.

Insulation elements 18 and 22 designed to prevent electrical arcing between the phases and grounded components are likewise situated between in particular the axially outer slip contact surfaces 12 of the phases L1 and L3 and further components, e.g. grounded end plates.

In order to lengthen the leakage paths between these different electrical potentials, ribs 23 are provided on the insulation elements 18, 19, 24 and 22 in this case.

The support element 4 is advantageously embodied as an integral support ring of electrically insulating material, which has ribs 29 on its outer circumferential surface 27 and/or on its inner circumferential surface 28 in order to lengthen the leakage path. The diameter 31 of the whole support element corresponds approximately to that of the slip ring unit 2. Depending on the compensation required in respect of the centrifugal force, the radial extent 29 corresponds to 1.5 to 5 times the diameter 33 of the terminal bolt 11 of the support ring, as shown in FIG. 5, for example. The axial thickness 32 of the support element 4 is dependent inter alia on the centrifugal stress and corresponds to 0.5 to 3 times the diameter 33 of the terminal bolt 11.

The support element 4 advantageously has a constant axial thickness 32. It is however also possible to provide axial bulges on the integral support element 4 during manufacture, particularly in the regions around the terminal bolts 11, in order to obtain improved radial bracing. In this case, said axial bulges surround the terminal bolts 11 with a ring of approximately the same thickness as the diameter of the terminal bolt 11.

Furthermore, the outer and inner circumferential surfaces 27, 28 of the support element 4 are so designed as to be essentially parallel. The radial rib height of the ribs which are arranged on the outer and inner circumferential surfaces 27, 28 is likewise identical.

In a further variant of the inventive idea, outer and/or inner circumferential surfaces 27, 28 of the support element 4 are so designed as to be conical. In other words, the axial course of the outer circumferential surface 27, staring from the end face of the slip ring unit 2, is oriented towards the axis 10. In addition or alternatively, the axial course of the inner circumferential surface 28, starting from the end face of the slip ring unit 2, runs away from the axis 10.

Viewed in a circumferential direction, this results in a trapezoidal cross section of the support element 4, i.e. the support ring. This is achieved by shaping the basic body of the support element 4 accordingly, in particular its basic circumferential surface on which the ribs 29 are arranged, and/or by varying the rib height of these circumferential ribs 29 if a plurality of ribs are provided as shown in FIGS. 2 to 5, for example. For example, those ribs 29 on the support element 4 which are located at the end face of the slip ring unit 2 have a greater rib height than the ribs which are arranged further away from the end face.

In other words, the rib height of the individual circumferential ribs decreases along the course of the axis.

The simple and effective structure of the slip ring unit 2 allows reliable and low-maintenance operation of such a rotary electrical machine, particularly when used as a generator for onshore or offshore wind power installations.

What is claimed is:

1. A slip ring unit for an electrically excited rotor of a rotary dynamo-electric machine, said slip ring unit comprising:
    an electrical terminal protruding axially from an end face of the slip ring unit and having a contact point;
    a circumferential slip contact surface electrically connected to the electrical terminal;
    an insulation element disposed adjacent to the slip contact surface;
    end plates axially retaining the circumferential slip contact surface and the insulation element;
    an electrically insulated support element arranged on an end face of the slip ring unit and having a cross section which substantially matches a cross section of the slip ring unit, said support element disposed in axial surrounding relation to the electrical terminal and radially supporting the electrical terminal; and
    an insulation surrounding the electrical terminal such that the contact point remains exposed.

2. The slip ring unit of claim 1, wherein the electrical terminal is a bolt.

3. The slip ring unit of claim 1, wherein the support element is configured to lengthen a leakage path.

4. The slip ring unit of claim 3, wherein the leakage path is lengthened at a radially outer circumferential surface of the support element.

5. The slip ring unit of claim 3, wherein the support element has circumferential ribs for lengthening the leakage path.

6. A rotary dynamo-electric machine, comprising:
an electrically excited rotor; and
a slip ring unit disposed on an axial extension of the rotor and including an electrical terminal protruding axially from an end face of the slip ring unit and having a contact point, a circumferential slip contact surface electrically connected to the electrical terminal, an insulation element disposed adjacent to the slip contact surface, end plates axially retaining the circumferential slip contact surface and the insulation element, an electrically insulated support element arranged on an end face of the slip ring unit and having a cross section which substantially matches a cross section of the slip ring unit, said support element disposed in axial surrounding relation to the electrical terminal and radially supporting the electrical terminal, and an insulation surrounding the electrical terminal such that the contact point remains exposed.

7. The dynamo-electric machine of claim 6, wherein the rotor and the slip ring unit rotate about a same axis.

8. The dynamo-electric machine of claim 6, wherein the electrical terminal is a bolt.

9. The dynamo-electric machine of claim 6, wherein the support element is configured to lengthen a leakage path.

10. The dynamo-electric machine of claim 6, wherein the leakage path is lengthened at a radially outer circumferential surface of the support element.

11. The dynamo-electric machine of claim 6, wherein the support element has circumferential ribs for lengthening the leakage path.

12. A wind power generator, comprising a rotary dynamo-electric machine, said rotary dynamo-electric machine comprising an electrically excited rotor, and a slip ring unit disposed on an axial extension of the rotor and including an electrical terminal protruding axially from an end face of the slip ring unit and having a contact point, a circumferential slip contact surface electrically connected to the electrical terminal, an insulation element disposed adjacent to the slip contact surface, end plates axially retaining the circumferential slip contact surface and the insulation element, an electrically insulated support element arranged on an end face of the slip ring unit and having a cross section which substantially matches a cross section of the slip ring unit, said support element disposed in axial surrounding relation to the electrical terminal and radially supporting the electrical terminal, and an insulation surrounding the electrical terminal such that the contact point remains exposed.

13. The wind power generator of claim 12, wherein the rotor and the slip ring unit rotate about a same axis.

14. The wind power generator of claim 12, wherein the electrical terminal is a bolt.

15. The wind power generator of claim 12, wherein the support element is configured to lengthen a leakage path.

16. The wind power generator of claim 12, wherein the leakage path is lengthened at a radially outer circumferential surface of the support element.

17. The wind power generator of claim 12, wherein the support element has circumferential ribs for lengthening the leakage path.

18. A wind power installation, comprising a wind power generator, said wind power generator comprising a rotary dynamo-electric machine, said rotary dynamo-electric machine comprising an electrically excited rotor, and a slip ring unit disposed on an axial extension of the rotor and including an electrical terminal protruding axially from an end face of the slip ring unit and having a contact point, a circumferential slip contact surface electrically connected to the electrical terminal, an insulation element disposed adjacent to the slip contact surface, end plates axially retaining the circumferential slip contact surface and the insulation element, an electrically insulated support element arranged on an end face of the slip ring unit and having a cross section which substantially matches a cross section of the slip ring unit, said support element disposed in axial surrounding relation to the electrical terminal and radially supporting the electrical terminal, and an insulation surrounding the terminal such that the contact point remains exposed.

\* \* \* \* \*